United States Patent Office 3,541,077
Patented Nov. 17, 1970

3,541,077
METHOD OF PREPARING PURE ALPHA-CYCLODEXTRIN
Frederick C. Armbruster, La Grange, Ill., assignor to CPC International Inc., a corporation of Delaware
No Drawing. Filed May 31, 1968, Ser. No. 733,255
Int. Cl. C08b 25/02
U.S. Cl. 260—209     15 Claims

ABSTRACT OF THE DISCLOSURE

This invention covers a method of isolating a substantially pure form of alpha-cyclodextrin from a mixture of alpha-cyclodextrin and beta-cyclodextrin. Process essentially includes the concept of selectively complexing the alpha form in the presence of the beta form, and then recovering the alpha form as the insoluble alpha complex and thereafter separating the alpha-cyclodextrin from the complexant. In a preferred embodiment, the mixture is first treated prior to the above step by crystallizing a substantial propotrion of the beta-cyclodextrin out of an aqueous solution containing the mixed cyclodextrins.

SPECIFICATION

Cyclodextrins, also known as Schardinger dextrins, are comprised of six or more anhydro-$\alpha$-D-glucose residues bonded together with 1,4-linkages to form cyclic compounds. Cyclodextrins may be more specifically classified by the number of glucose units present. The six membered ring is referred to as alpha-cyclodextrin or cyclohexaamylose, the seven membered ring as beta-cyclodextrin or cycloheptaamylose, and so forth.

As a result of their unique cyclic structure, cyclodextrins offer considerable potential as complexing agents because they form inclusion compounds with molecules which reside within the cavity of the cyclic molecule. Potential applications in the food, tobacco, and medicinal fields as well as many other fields, are numerous.

Cyclodextrins are produced from starch by the action of an enzyme commonly known as cyclodextrin transglycosylase (B. macerans amylase). The source of the enzyme is usually a culture of Bacillus macerans. To produce the cyclodextrin synthesizing enzyme, Bacillus macerans is grown under suitable conditions on appropriate media containing suitable sources of nitrogen, carbon, growth factors and minerals. Various appropriate means for producing cyclodextrin transglucosylase are described in the literature (D. French in "Methods in Enzymology," S. P. Colowick and N. O. Kaplan, editors, Academic Press New York, N.Y., vol. V, 1962, pp. 148–155).

According to conventional past procedures for producing cyclodextrins, cyclodextrin transglucosylase is added to a dilute solution of an appropriate gelatinized starch and enzymolysis is permitted to proceed under conditions which are conducive to continued enzyme action for sufficient time to permit the conversion of the starch to cyclodextrins.

While there have been a number of improvements of the basic method of making cyclodextrins as briefly outlined above, and practical means for the production and purification of beta-cyclodextrin do exist, to date there is no practical means for the production of pure alpha-cyclodextrin. It is produced in a mixture containing both alpha-cyclodextrin and beta-cyclodextrin. Yet in many instances one desires to obtain only the pure form of the alpha- or the beta-cyclodextrin. It is particularly desirable to attain a purified form of the alpha form since it has high water solubility relative to the beta form, and thus can be utilized in many applications where corresponding use of the beta form would be impractical. Again the alpha and beta forms, in some instances, selectively complex different materials. That is, one of the forms may complex a specific material while the other does not have this capability. Thus it would be advantageous to obtain a pure source of the alpha form in order to take advantage of its selective complexing ability.

To date there are a number of known techniques to obtain a relatively pure source of the beta form. One such technique is to dissolve the mixture of the alpha- and beta-cyclodextrin in hot water, the beta form being materially less soluble than the alpha form then crystallizes upon cooling the aqueous dissolved mixture down to room temperature. This leaves the more soluble alpha form in solution along with residual beta-cyclodextrin. However, the highest content of cyclodextrin that one can obtain by this procedure is about 89% alpha-cyclodextrin, 11% beta.

Previously, there has been no simple, efficient and relatively inexpensive method of isolating a relatively pure source of alpha-cyclodextrin, say one having at least a 95% purity or more. The best prior art methods available involve following the crystallization procedure described above, then diluting the remaining mother liquor to a relatively low solids content, usually less than about 4% solids, and then treating the dilute solution with a complexant which complexes the beta form in the presence of the alpha form. The complexed beta-cyclodextrin is removed as a precipitate. Then another complexant is added to precipitate the alpha form from the dilute solution. The disadvantages of such a process are apparent since one must work under a condition of high dilution and two expensive complexants.

In view of the above, it therefore becomes an object of the invention to provide a simple, inexpensive and practical method of isolating relatively pure alpha-cyclodextrin.

Another object of the invention is to provide a practical process for the separation of alpha-cyclodextrin from a mixture of cyclodextrins, and particularly, from a mixture of alpha-cyclodextrin and beta-cyclodextrin.

A more specific object of the invention is to provide a method of isolating alpha-cyclodextrin having a purity of at least 95%, and preferably close to a 100% purity.

A still further object of the invention is to carry out the above aims while still operating at relatively high concentrations, whereupon subsequent processing expense to provide a pure, dry material is reduced to a minimum.

Yet another object of the invention is to provide a practical method of recovering substantially pure alpha-cyclodextrin from mixtures of alpha- and beta-cyclodextrins, where the mixtures may differ as to their relative proportions of the alpha form to the beta form over a wide range.

Yet another object of the invention is to provide a practical method of making a substantially pure form of alpha-cyclodextrin in relatively high yield.

Another specific object of the invention is to provide a method of making high purity alpha-cyclodextrin without resort to expensive reagents or sophisticated equipment.

Other objects will appear hereinafter.

In accordance with one preferred embodiment thereof, the invention comprises treating an aqueous solution of a mixture of cyclodextrins, containing an amount of at least 5% by weight of solids of each alpha-cyclodextrin and beta-cyclodextrin, with an alpha-cyclodextrin complexant. The complexant is added to the aqueous solution of the mixture in an amount sufficient to selectively complex and precipitate out only the alpha form in the presence of the dissolved beta form. As will be shown below, it is important that no excess of the complexant-reagent be added, since such excess then tends to complex the beta form also leading to a situation where the precipitated alpha form product is contaminated with the unwanted beta-cyclodextrin. The amount of complexant which should be added will differ for different types of complexing reagents. However, the maximum amount of complexant in each individual case can be empirically determined by routine trials.

The precipitated alpha-cyclodextrin complex is removed from the aqueous solution in routine fashion, and the complexant is then separated from the alpha-cyclodextrin. By carefully following the steps of the invention, a purified alpha-cyclodextrin of at least a 95% purity is easily recovered. In many instances, as will be shown below, a substantially 100% pure alpha-cyclodextrin is obtained.

DETAILED DESCRIPTION OF THE INVENTION

As noted above, the cyclodextrin mixture to be purified can be produced by any of the known processes. These procedures may involve gelatinizing and thinning starch with a bacterial alpha-amylase followed by conversion to cyclodextrins with the enzyme of *Bacillus macerans*.

In the usual case the conversion product is a mixture of alpha-cyclodextrin and beta-cyclodextrin of which the alpha form constitutes from about 30% by weight to about 70% by weight. More often, the alpha form comprises from about 40% to about 60% by weight of the mixture. In a typical process approximately half of the cyclodextrin formed is alpha-cyclodextrin, with the other half being beta-cyclodextrin. The mixture can be isolated from the conversion reaction mass, by for example, adding a complexing agent which forms an insoluble precipitate of the mixture of cyclodextrins. The precipitate is then removed from the conversion liquor by filtration and the complex is broken in some manner, such as by heating and driving off the volatile complexing agent.

In a greatly preferred embodiment of the invention, the solution of the mixture of alpha-cyclodextrin and beta-cyclodextrin is first subjected to the prior art step of selective crystallization. In order then to isolate the majority of the beta-cyclodextrin the mixture of cyclodextrins is dispersed in water. In a typical case the solids content of the dispersion of mixed alpha- and beta-cyclodextrins is in the range of about 15 to about 40 weight percent of solids. More often the solids content ranges from about 20% to about 30% by weight.

In this initial step of purification by crystallization, it is important that the amount of mixture added to water be such that the amount of alpha-cyclodextrin present does not exceed its solubility at the temperature to which the crystallizing liquor is cooled. For example, this solubility is approximately 14 g. per 100 ml. at 30° C. in water.

The aqueous dispersion is then heated to the point where all the solids are completely dissolved. In a typical run the solution is heated to greater than 70° C. whereupon the alpha-cyclodextrin and beta-cyclodextrin are dissolved.

The solution temperature is then allowed to drop back or cooled to room temperature, for example, whereupon the majority of the beta-cyclodextrin originally present crystallizes out of the solution. This precipitate is then separated from the mother liquor by any conventional means such as centrifugation, filtration, etc.

The beta-cyclodextrin precipitate is substantially in a highly purified form. If a completely pure crystalline beta-cyclodextrin product is desired the impurities which are present may be removed. Thus, for example, certain undesirable impurities such as retrograded starch, color bodies, etc. may be conveniently removed by dissolving the crystalline beta-cyclodextrin in hot water, treating the hot solution with carbon and filtering out the entrapped impurities with the carbon. Similarly, if there is present a small amount of alpha-cyclodextrin with the beta-cyclodextrin product, the alpha-cyclodextrin content can be reduced by recrystallization or by adequately washing the initial crystalline filter cake to remove entrapped mother liquor containing alpha-cyclodextrin.

The mother liquor remaining after the beta-cyclodextrin component has been removed contains a substantial proportion of alpha-cyclodextrin and that amount of beta-cyclodextrin which is soluble at room temperature. Since the solubility of beta-cyclodextrin in water at 20° C. is about 1.5 g. per 100 ml., it is therefore impossible by the above simple crystallization step, or even by recrystallization techniques, to produce an entirely pure alpha-cyclodextrin fraction. The best that one can achieve is about a 89% pure alpha-cyclodextrin material. Therefore, it is necessary to resort to other procedures to obtain a more highly purified alpha-cyclodextrin fraction. By resorting to the concepts of the invention listed in more detail below one can achieve a highly purified alpha-cyclodextrin wherein at least 95% of the total cyclodextrin present is in the alpha-cyclodextrin form. In most instances a 100% pure alpha-cyclodextrin can be realized.

Whether or not the first step of crystallization is practiced as described above, though this is highly preferred, the further steps of the invention are then carried out. Usually the mixture of cyclodextrins undergoing treatment comprises 70–90% by weight of alpha-cyclodextrin and 10–30% by weight of beta-cyclodextrin based on total weight of both components. More often, the mixture to be purified contains 85–90% by weight of alpha form and 10–15% by weight of beta form. This mixture is then first dissolved in water. Of course, if the initial step of crystallization has already been practiced, the alpha and beta forms are already dissolved in water, preferably each to their maximum degree of solubility. The aqueous solution to be further treated normally contains at least 5% by weight of total solids and can be as high as 15% by weight of dissolved solids, if the final temperature of the initial crystallization was 20° C., or even higher if the initial crystallization was terminated at higher temperatures. It is preferred, of course, for reasons of greater efficiency and throughput that the solution to be treated contains as much total solids as can be tolerated. Usually the solution undergoing treatment contains at least 10–15% by weight of total solids of alpha- and beta-cyclodextrins.

The aqueous solution of mixed cyclodextrins is then treated by adding thereto a complexant. The complexing agent should be added in an amount sufficient to selectively complex the alpha form in presence of the beta form, but less than that amount which begins to complex the beta form. The maximum amount of complexant which can be tolerated will vary, of course, depending upon the particular compexing agent utilized, the amount of total solids present, and the proportion of alpha- and beta-cyclodextrins present with respect to one another. In order to determine the limit of complexant which can be added, it is only necessary to run a number of experiments in which the amount of complexant is gradually increased. When the insoluble alpha complex begins to also show substantial amounts of beta form also in complexed form, the maximum amount of complexant to be used has been reached. Thus, up to this amount of complexing reagent can be added without resulting in contamination of the alpha form with the beta form. Use of much lesser amounts than the maximum amount of complexant which can be tolerated will result in a situation wherein a highly purified alpha form is produced, though in lesser yields. Thus, it is important for reasons of greatest process efficiency to determine that amount of complexant which can be used which gives greatest yields in terms of recovery of total alpha-cyclodextrin originally present, but is less than that amount which tends to also complex the beta form. As noted above, this amount of complexant which should be added can be easily determined by a number of routine experiments, and will greatly vary depending upon the chemical constituency of the complexant.

After the complexing agent is added, the complexant-treated solution should be agitated for that length of time sufficient to selectively complex the alpha-cyclodextrin present. The time of contact between complexant and alpha-cyclodextrin is not considered critical and again will greatly vary depending upon the complexing agent used. In a typical run the complexant-treated solution is agitated for from about 5 to around 120 minutes before removal of alpha-cyclodextrin as a complexed precipitate.

A wide variety of complexing agents may be used of diverse chemical structure. Usually the complexant is a liquid which can be dispersed with agitation throughout the aqueous solution to be treated. Thus, for example, such complexants may be used as cycloaliphatics such as cyclohexane, halo-substituted aliphatics, such as tetrachloroethane and trichloroethylene, aliphatics such as hexane, aryl and alkaryl compounds such as benzene, alcohols and higher aliphatic alcohols such as 1-octanol, and diverse reagents such as carbon disulfide.

After the precipitate of complexed alpha-cyclodextrin is formed, it is removed from the remaining aqueous solution by conventional techniques including centrifugation, filtration, etc. Centrifugation is preferred here.

In order to isolate the pure alpha form, it is only then necessary to separate out the complexant from the alpha-cyclodextrin. In most cases this is simply done by heating the complex in water whereby the complex is broken and the complexant is distilled off. Where the complexant has a higher boiling point than water the separation step is best effected by steam stripping or steam distillation, or solvent extraction.

Like the purification of the beta form, the alpha form can also be further refined such as by treating with carbon, and filtering off the treated solution from the carbon containing entrapped impurities. The alpha-cyclodextrin may also be recrystallized if desired. However, in the usual case, such is not necessary, since the recovered alpha form is already substantially 100% pure.

In another preferred embodiment of the invention the treated aqueous solution remaining after removal of the precipitate complex may be recycled and then retreated according to the directions outlined above. This particularly tends to substantially improve recovery yields of the alpha-cyclodextrin making the overall process more economical.

One important essential concept of the invention lies in the discovery that alpha-cyclodextrin may be precipitated in high purity from mixed cyclodextrin solutions provided that the amount of precipitant employed is restricted to not more than that which will preferentially form an insoluble complex with the alpha-cyclodextrin present. Heretofore, this was an unrecognized concept in that it was not appreciated that with many precipitants alpha-cyclodextrin forms a stable insoluble complex more readily than beta-cyclodextrin. This was entirely unexpected and forms the essence of the invention. In short, alpha-cyclodextrin purity is assured by controlling the amount of precipitant present, rather than controlling the total amount of cyclodextrins present as in the case of prior art processes.

As a result of this discovery, it was possible to obtain very high purity alpha-cyclodextrin from much more highly concentrated cyclodextrin solutions than was heretofore possible or deemed possible. In point of fact, then, one can treat highly concentrated mixtures of cyclodextrin up to about 15% total solids wherein the cyclodextrin concentration is approaching the maximum water-solubility of each form, that is, about 14 g. of alpha-cyclodextrin/100 ml. of water and 1.5 g. of beta-cyclodextrin/100 ml. at 20–25 C. temperature. In all prior art processes one had to operate at relatively dilute concentrations regardless of the method employed. Here this drawback has been overcome.

The following analytical method was used to determine the respective amounts of alpha- and beta-cyclodextrins present in the cyclodextrin mixtures.

Essentially, the method involved conversion of the cyclodextrins to their dimethylsilyl ethers in pyridine solution. The converted products were then separated according to molecular size on a gas chromatographic column, and their concentrations measured by a flame ionization detector upon elution from the column.

More specifically, an appropriate amount of a standard cyclodextrin mixture, that is one approximately similar to the one being measured, is weighed into a 25-ml. volumetric flask. 4.0 ml. of pyridine, 4.0 ml. of tetramethyldisilazane and 0.4 ml. of trifluoroacetic acid are then added to the flask. After the reaction is subsided, the flask is mixed and boiled for 15 minutes on a hot plate. The flask is then cooled and diluted to volume with pyridine. A 3 micro-liter portion of the solution is removed and injected into the chromatograph whereby the various components are eluted. When the last component has been eluted the area under the various peaks is determined using a suitable method of integration.

The sample to be analyzed is then weighed accurately in an amount of about 100–110 mg. of total cyclodextrin sample. This amount is placed into a 25-ml. volumetric flask, 5 ml. of distilled water added, and the cyclodextrin and water is then mixed. The water is allowed to evaporate completely on a steam bath and the above described reagents are added. The just-described chromatograph procedure is then followed and the concentration of each component of alpha- or beta-cyclodextrin is obtained by comparing standard and sample areas for the particular component according to the following equation. Percent component composition is then measured in the following manner:

$$\text{Percent component concentration} = \frac{(\text{Sample Component Area} \times \text{Attentuation}) \times \text{Standard Component Weight, mg.} \times 100}{(\text{Standard Component Area} \times \text{Attentuation}) \times \text{Sample Weight, mg.}}$$

The following examples illustrate a typical mode of carrying out the aims of the invention, and also demonstrate the ease of determining the optimum amount of complexing agent which should be added. It is understood, of course, that these examples are merely illustrative, and the invention is not to be limited thereto. All parts and percentages are in terms of weight unless otherwise indicated.

EXAMPLE I

The process of the invention

Potato starch was first gelatinized and thinned with bacterial alpha-amylase. The starch was then converted to a mixture of alpha- and beta-cyclodextrins by means of the cyclodextrin synthesizing enzyme of *Bacillus macerans*. Approximately 45% of the cyclodextrins formed was alpha-cyclodextrin and approximately 55% was beta-cyclodextrin.

These were isolated from the conversion mixture by addition of cyclohexane which complexed the mixture as an insoluble precipitate. The precipitate was then separated from the conversion liquor by filtration. The crude cyclodextrin-cyclohexane complex was then added to water at a concentration of 26 g. of cyclodextrins per 100 ml. of water. The mixture was boiled to break the complex, dissolve the cyclodextrins and to drive off any cyclohexane present. In this run the temperature of the water exceeded 70° C. whereupon the mixture of cyclodextrins was completely dissolved. The hot solution contained approximately 11.9 g. of alpha-cyclodextrin and 14.0 g. of beta-cyclodrextrin in dissolved form.

The temperature of the hot solution was then allowed to be reduced to approximately 25° C. whereupon beta-cyclodextrin crystallized from solution. The beta-cyclodextrin was then subsequently filtered to yield approximately 11.8 g. of beta-cyclodextrin per 100 ml. of solution in a purified crystallized form. The filtrate contained substantially all of the original alpha-cyclodextrin present (11.9 g.) and that amount of beta-cyclodextrin which remained solubilized at that temperature (2.2 g.).

To the above cyclodextrin solution was added 0.73 g. of cyclohexane per 100 ml. of solution, which is equivalent to 0.71 mole of cyclohexane per mole of alpha-cyclodextrin present. The cyclohexane was added while the cyclodextrin solution was being vigorously stirred. This enabled the cyclohexane to be quickly and intimately dispersed into the solution. Stirring was continued for 15 minutes, and the mixture was then held for 5 minutes without stirring. The insoluble complex that had formed was recovered by vacuum filtration, washed on the filter with 10 ml. of cold water, dried under vacuum at 80° C. for 36 hours, and then weighed and analyzed by gas chromatography for cyclodextrin content.

The precipitate was found to contain 10.6 g. of alpha-cyclodextrin per 100 ml. of starting cyclodextrin solution used. The beta-cyclodextrin content was nil. Thus, 89% of the alpha-cyclodextrin present in original mixture was recovered in pure form as the cyclohexane complex. The complex was broken and the cyclohexane removed by dispersing the insoluble complex in water and boiling to drive off the cyclohexane. Pure complexant-free alpha-cyclodextrin was recovered by conventional crystallization procedures.

The mother liquor, from the selective precipitation step, which contained the residual alpha-cyclodextrin (approximately 1.3 g. per 100 ml.) and essentially all the beta-cyclodextrin (approximately 2.2 g. per 100 ml.) was recycled to the head of the process.

EXAMPLE II

Procedure for selecting suitable alpha-cyclodextrin complexants

This example illustrates how alpha-cyclodextrin precipitants suitable for the process of this invention may be selected.

An approximately 15% solids cyclodextrin solution was prepared by dissolving a mixture of alpha- and beta-cyclodextrins in water. To aliquots of this solution, which contained 84% alpha-cyclodextrin and 16% beta-cyclodextrin on a solids basis, was added the complexant to be tested in an amount equivalent to not more than 1.0 mole per mole of alpha-cyclodextrin present. As in Example I the complexant was added while the solution was being vigorously stirred, and the stirring was continued for 15 minutes, after which the mixture was held for an additional 5 minutes without stirring. The insoluble cyclodextrin-complexant-precipitate was recovered by vacuum filtration, washed, dried and analyzed for alpha- and beta-cyclodextrin content.

Complexants suitable for the process of this invention are recognized by their yielding cyclodextrin-precipitates that on a solids basis are enriched in the amount of alpha-cyclodextrin present in comparison to that present in the starting cyclodextrin solution.

The results obtained with seven potential alpha-cyclodextrin complexants, in addition to cyclohexane, that were tested by the above procedure are shown in the following table. In these tests the starting cyclodextrin solutions were comprised of 300 ml. quantities of a solution containing 11.9 g. of alpha-cyclodextrin and 2.2 g. of beta-cyclodextrin (84% alpha-cyclodextrin, 16% beta-cyclodextrin, based on total solids) per 100 ml.

The results show that of the eight complexants tested, cyclohexane, tetrachloroethane, trichloroethylene, benzene, hexane, 1-octanol and carbon disulfide are suitable for use; whereas toluene, which failed to give an enrichment of alpha-cyclodextrin in the precipitate, is not suitable.

TABLE I

| Complexant | Cyclodextrin solubility in presence of excess complexant (g./100 ml.) | | Amount of complexant used (mole/mole α-cyclodextrin) | Insoluble cyclodextrin recovered | | | |
|---|---|---|---|---|---|---|---|
| | α | β | | (g./100 ml.) | Composition, percent | | Percent of total α-cyclodextrin present |
| | | | | | α | β | |
| Cyclohexane | 0.22 | 0.13 | 0.71 | 10.6 | 100 | 0 | 89 |
| Tetrachloroethane | 0.08 | 0.12 | 0.93 | 5.1 | 100 | 0 | 43 |
| Trichloroethylene | 0.26 | 0.03 | 0.93 | 1.9 | 99.7 | 0.3 | 16 |
| Benzene | 0.71 | 0.08 | 0.93 | 4.2 | 100 | 0 | 35 |
| Hexane | | | 0.93 | 3.6 | 100 | 0 | 30 |
| 1-Octanol | | | 0.93 | 12.0 | 100 | 0 | 100 |
| Carbon Disulfide | 0.08 | 0.07 | 0.93 | 3.2 | 97.0 | 3.0 | 26 |
| Toluene | 0.9 | 0.06 | 0.93 | 6.6 | 82.6 | 17.4 | 46 |

As can be seen from the above table, compositions of alpha-cyclodextrin were obtained in exceptionally high purity, and in many instances 100% pure alpha-cyclodextrins were obtained. Also, it is seen that the complexant may widely vary as to its chemical make-up with both aromatic and aliphatic reagents being suitable as well as those having various functional groups.

In another series of tests other liquids were proposed as complexing agents which are known as complexants for both the alpha and beta forms. However, some of these, like toluene were not useful in the invention. That is, the reagent did not selectively complex the alpha-cyclodextrin in the presence of the beta form. Thus, known complexants which are capable of complexing both form simultaneously are sometimes useless for purposse of the instant invention in that they cannot selectivelly complex the desired alpha form.

Also, the above results show that solubilities of cyclodextrins in the presence of excess complexant cannot be used to predict the purity of the complex obtained by the process of this invention. For example, since alpha-cyclodextrin is more soluble than beta-cyclodextrin in the presence of benzene (Table I), one would expect the insoluble complex obtained to be enriched in beta-cyclodextrin rather than the alpha-cyclodextrin. Yet an exactly opposite result was obtained in an unexpected manner.

Lastly, the above results show that the complexants may vary widely as to that amount required to give good alpha-cyclodextrin recovery, that is, yield alpha-cyclodextrins of exceptional purity concomitant with satisfactory yields.

Of the complexants tested, it appears that cyclohexane and 1-octanol are most preferred from the standpoint of cost, selectivity, and yields and purity of alpha-cyclodextrin.

Importance of use of proper amount of complexant

The following examples show that the selectivity of insoluble complex formation is dependent upon the complexant concentration, and that if too much complexant is used, selectivity for the alpha-cyclodextrin form is lost.

EXAMPLE III

Recovery of alpha-cyclodextrin by selective complexing with cyclohexane

Cyclohexane was added in the amount shown in Table II below to 400 ml. portions of a cyclodextrin solution having a pH of 7.0 and containing 13.1 g. of alpha-cyclodextrin and 1.5 g of beta-cyclodextrin per 100 ml. of water (89% alpha-cyclodextrin, 11% beta-cyclodextrin).

Following the procedure described in Example I, the solutions were vigorously stirred for 15 minutes and thereafter held without stirring for 15 minutes prior to recovering the insoluble cyclodextrin complexes by filtration. The analyses of the products obtained are presented below. As is apparent from the table, the optimum amount of cyclodextrin complexant is about 1 mole of cyclohexane per mole of alpha-cyclodextrin originally present. As is shown, lesser amounts can also be used than the optimum. However, efficiency of the process falls off in terms of a lesser total recovery of the alpha-cyclodextrin present. Use of complexing agent in excess of that required results in a situation of complexing both the alpha and beta forms. In fact, use of excess complexant over the optimum results in substantially all the beta form present being complexed in addition to the alpha form.

TABLE II

| | Insoluble complex recovered | | | |
|---|---|---|---|---|
| | | Composition, percent | | Percent of total α-cyclodextrin present |
| Amount of cyclohexane used (mole/mole α-cyclodextrin) | (g./100 ml.) | α | β | |
| 0.22 | 1.9 | 100 | 0 | 15 |
| 0.44 | 6.2 | 100 | 0 | 47 |
| 0.66 | 8.3 | 100 | 0 | 63 |
| 0.88 | 8.9 | 100 | 0 | 68 |
| 1.76 | 13.6 | 89.5 | 10.5 | 93 |
| 3.52 | 14.6 | 89.5 | 10.7 | 100 |

EXAMPLE IV

Recovery of alpha-cyclodextrin by selective complexing with 1-octanol

This experiment was run essentially as outlined in Example III above with the exception that the original cyclodextrin solution contained 12.5 g. of alpha-cyclodextrin and 1.5 g. of beta-cyclodextrin per 100 ml. of water (89% alpha-cyclodextrin, 11% beta-cyclodextrin). As is readily apparent from Table III below, the optimum amount of 1-octanol that can be used is approximately 1 mole per mole of alpha-cyclodextrin present. Again lesser amounts can also be used although the process efficiency falls off somewhat in terms of product recovery as lesser and lesser amounts of complexant are utilized.

TABLE III

| | Insoluble complex recovered | | | |
|---|---|---|---|---|
| | | Composition, percent | | Percent of total α-cyclo dextrin present |
| Amount of 1-octanol used (mole/mole α-cyclodextrin) | (g./100 ml.) | α | β | |
| 0.22 | 5.2 | 100 | 0 | 42 |
| 0.44 | 8.5 | 100 | 0 | 67 |
| 0.66 | 10.7 | 100 | 0 | 85 |
| 0.87 | 10.4 | 100 | 0 | 83 |
| 1.1 | 13.5 | 92.5 | 7.5 | 99 |
| 1.3 | 14.4 | 86.1 | 13.9 | 98 |
| 1.7 | 13.4 | 91.6 | 8.4 | 98 |

EXAMPLE V

Recovery of alpha-cyclodextrin by selective complexing with tetrachloroethane

This experiment was run essentially as set out in Example IV with the exception that tetrachloroethane was the complexing agent. The optimum amount of tetrachloroethane which should be used as determined in this experimental work was approximately 3 moles of tetrachloroethane per mole of alpha-cyclodextrin.

TABLE IV

| | Insoluble complex recovered | | | |
|---|---|---|---|---|
| | | Composition, percent | | Percent of total α-cyclo- dextrin present |
| Amount of tetrachlorethane used (mole/mole α-cyclodextrin) | (G./100 m.) | α | β | |
| 0.62 | 3.2 | 100 | 0 | 2 |
| 0.92 | 5.0 | 100 | 0 | 45 |
| 1.2 | 6.1 | 100 | 0 | 40 |
| 1.8 | 8.9 | 100 | 0 | 78 |
| 2.5 | 10.8 | 100 | 0 | 81 |
| 3.1 | 12.1 | 98.3 | 1.7 | 96 |
| 3.7 | 15.7 | 90.3 | 9.7 | 104 |

EXAMPLE VI

Complexing time not critical

This experiment was run to show the effect of time on recovery of alpha-cyclodextrin, and demonstrates that the hold time in the reaction vessel is not particularly critical as far as purity of the final alpha-cyclodextrin product is concerned. That is, the contact time of the complexing agent with alpha-cyclodextrin can be widely varied without demonstrating any substantial differences in percent purity.

Here cyclohexane was added in an amount equivalent to 0.6 mole per mole of alpha-cyclodextrin present in 300 ml. quantities of a solution of cyclodextrins comprising 12.5 g. of alpha-cyclodextrin and 1.5 g. of beta-cyclodextrin per 100 ml. of water (89% alpha-cyclodextrin, 11% beta-cyclodextrin). The solutions were vigorously stirred for 10 minutes and then filtered after various standing periods or hold times without stirring. Results are shown below in Table V. It can be seen that the hold time can be widely varied without affecting purity of the final alpha-cyclodextrin product.

TABLE V

| | Insoluble complex recovered | | | |
|---|---|---|---|---|
| | | Composition, percent | | Percent of total α-cyclo- dextrin present |
| Hold time (minutes) | (g./100 ml.) | α | β | |
| 0 | 4.9 | 100 | 0 | 39 |
| 5 | 4.9 | 100 | 0 | 39 |
| 5 | 6.4 | 100 | 0 | 51 |
| 10 | 7.8 | 100 | 0 | 62 |
| 20 | 7.5 | 100 | 0 | 59 |
| 40 | 9.3 | 100 | 0 | 74 |
| 60 | 10.3 | 100 | 0 | 82 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method of isolating a substantially pure form of alpha-cyclodextrin from a mixture of alpha-cyclodextrin and beta-cyclodextrin which comprises:
    treating an aqueous solution of said mixture with an alpha-cyclodextrin complexant in an amount sufficient selectively to complex said alpha form in the presence of said beta form, but less than that amount sufficient to complex said beta form, whereby an alpha-cyclodextrin complexed precipitate is produced;

removing said precipitate from said aqueous solution; and removing said complexant from said alpha-cyclodextrin to produce a purified alpha-cyclodextrin of at least 95% purity.

2. A method in accordance with claim 1 wherein said mixture comprises 70–90% by weight of alpha-cyclodextrin and 10–30% by weight of beta-cyclodextrin.

3. A method in accordance with claim 1 wherein said complexant-treated solution is agitated for a time sufficient to selectively precipitate a substantial amount of the alpha-cyclodextrin in said mixture.

4. The method of claim 1 wherein said precipitate is removed from said aqueous solution by centrifugation or filtration, and said complexant is separated from said alpha-cyclodextrin by distilling off said complexant.

5. The method of claim 4 wherein said separation step is effected by steam stripping.

6. The method of claim 1 wherein said treated aqueous solution remaining after removal of said precipitate is recycled and retreated according to the method of claim 1 in order to substantially improve recovery yields of said alpha-cyclodextrin.

7. The method of claim 1 wherein said complexant is selected from the group consisting of cyclohexane, tetrachloroethane, trichloroethylene, benzene, hexane, 1-octanol, and carbon disulfide.

8. The method of isolating a substantially pure form of alpha-cyclodextrin from a mixture of alpha-cyclodextrin and beta-cyclodextrin which comprises:

preparing an aqueous dispersion of said mixture wherein the concentration of said alpha-cyclodextrin in said mixture does not exceed its solubility at the final temperature of crystallization;

heating said solution to completely dissolve said alpha-cyclodextrin and beta-cyclodextrin;

cooling said solution whereby the majority of said beta-cyclodextrin present crystallizes out of said solution;

separating out said precipitated beta-cyclodextrin from the residual mother liquor;

further treating with a complexant the resulting aqueous mother liquor, which contains both alpha-cyclodextrin and the remaining beta-cyclodextrin left in solution, said complexant being added in an amount sufficient to selectively precipitate said alpha form in presence of said beta form but less than that amount sufficient to complex said beta form, whereby an alpha-cyclodextrin complexed precipitate is produced;

removing said precipitate from said aqueous solution; and removing said complexant from said alpha form to produce a purified alpha-cyclodextrin of at least 95% purity.

9. The method of claim 8 wherein the original mixture undergoing said first step of crystallization contains 15–40 weight percent of solids of a mixture of alpha-cyclodextrin and beta-cyclodextrin and wherein each of said cyclodextrin is present in an amount of 30–70% by weight based on the weight of the entire mixture.

10. The method of claim 9 wherein the solids content of said mixture ranges from about 20% to about 30%.

11. The method of claim 8 wherein said mixture is heated above 70° C. to completely dissolve said alpha-cyclodextrin.

12. The method of claim 8 wherein said mixture after said initial crystallization step which is to undergo further treatment comprises 70–90% by weight of alpha-cyclodextrin and 10–30% by weight of beta-cyclodextrin.

13. The method of claim 8 wherein said complexant-treated solution is agitated for a time sufficient to selectively precipitate a substantial amount of the alpha-cyclodextrin present.

14. The method of claim 8 wherein said precipitate is removed from said aqueous solution by centrifugation or filtration and said complexant is separated from said alpha-cyclodextrin by distilling off said complexant.

15. The method of claim 8 wherein said complexant is selected from the group consisting of cyclohexane, tetrachloroethane, trichlorethylene, benzene, hexane, 1-octanol, and carbon disulfide.

References Cited

UNITED STATES PATENTS 3,140,184    7/1964    Robbins.

LEWIS GOTTS, Primary Examiner

J. R. BROWN, Assistant Examiner

PO-1050
(5/69)

UNITED STATES PATENT OFFICE
CERTIFICATE OF CORRECTION

Patent No. 3,541,077          Dated November 17, 1970

Inventor(s) Frederick C. Armbruster

It is certified that error appears in the above-identified patent and that said Letters Patent are hereby corrected as shown below:

Column 1, line 21, "propotrion" should read "proportion";

Column 8, line 53, "purposse" should read "purpose";

Column 8, line 54, "selectivelly" should read "selectively";

Column 10, Table IV under the heading "Percent of total -cyclodextrin present"

| | | |
|---|---|---|
| 2 | should read | 25 |
| 45 | " " | 40 |
| 40 | " " | 48 |
| 78 | " " | 71 |
| 81 | " " | 86 |
| 96 | " " | 94 |
| 104 | " " | 100 |

Column 10, Table V, delete line 2 of table;

Column 12, line 10, "complevant" should read "complexant".

Signed and sealed this 27th day of April 1971.

(SEAL)
Attest:

EDWARD M. FLETCHER, JR.
Attesting Officer

WILLIAM E. SCHUYLER,
Commissioner of Pate